United States Patent [19]

Suzuki

[11] 4,215,372
[45] Jul. 29, 1980

[54] TELEVISION SIGNAL INTERFERENCE ELIMINATION CIRCUIT INCLUDING A TRAP CIRCUIT

[75] Inventor: Sadao Suzuki, Tokyo, Japan

[73] Assignee: Sony Corporation, Tokyo, Japan

[21] Appl. No.: 942,693

[22] Filed: Sep. 15, 1978

[30] Foreign Application Priority Data

Sep. 28, 1977 [JP] Japan .................. 52-130253[U]

[51] Int. Cl.² .................. H04B 1/16; H04N 5/44
[52] U.S. Cl. .................. 358/188; 358/191.1; 455/280; 455/286
[58] Field of Search .................. 358/188, 191, 196; 325/371, 379, 473, 477, 479

[56] References Cited
U.S. PATENT DOCUMENTS

| 2,779,924 | 1/1957 | Chatellier | 333/76 |
| 3,416,086 | 12/1968 | Carlson | 325/436 |
| 3,519,737 | 7/1970 | Marsh, Jr. | 358/196 |

Primary Examiner—Robert L. Richardson
Attorney, Agent, or Firm—Lewis H. Eslinger; Alvin Sinderbrand

[57] ABSTRACT

A television signal processing circuit having an RF tuner includes a frequency responsive trap connected to a signal path of an IF amplifier to reject an undesirable interfering signal applied from the local oscillator of another tuner when the RF tuner and the other tuner are connected to a common antenna terminal.

12 Claims, 3 Drawing Figures

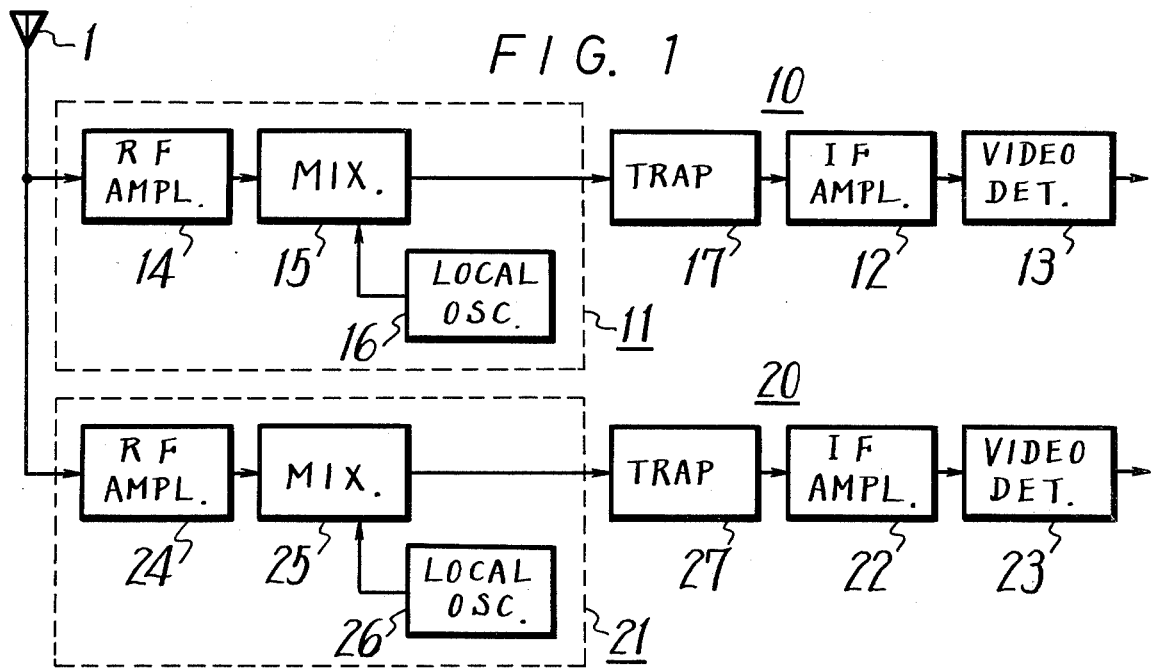
FIG. 1
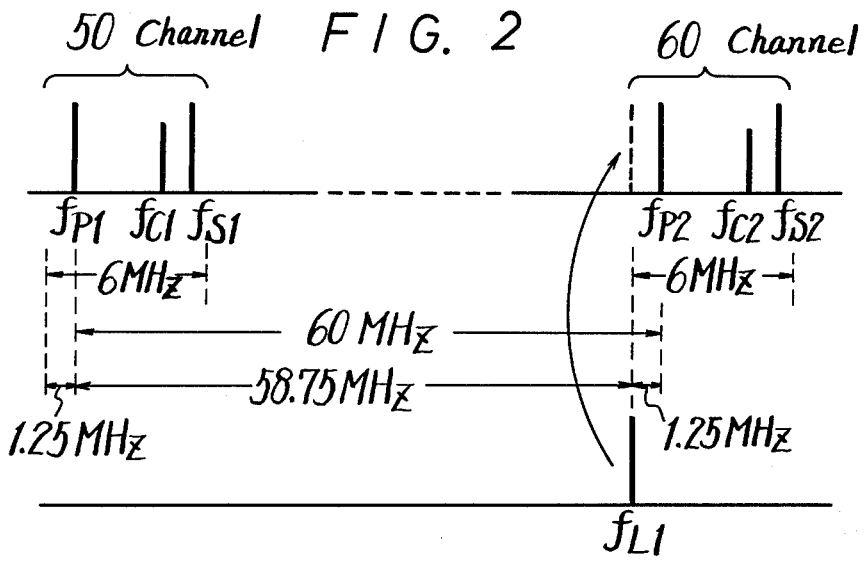
FIG. 2
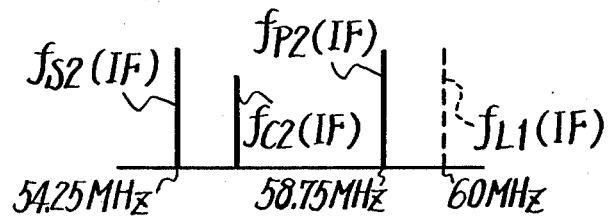

TELEVISION SIGNAL INTERFERENCE ELIMINATION CIRCUIT INCLUDING A TRAP CIRCUIT

BACKGROUND OF THE INVENTION

1. Field of the Invention

The present invention generally relates to a television signal processing circuit, and particularly to a circuit which eliminates interference between two processing circuits caused by a signal from the tuner of one circuit on the other circuit when two processing circuits are adjacently positioned.

2. Description of the Prior Art

In a prior art television receiver, it has been known that the local oscillator signal of one tuner interferes with the second harmonic of the audio carrier frequency to generate a beat on the television screen, or to exhibit a phenomenon of so-called 6-channel beat. In order to eliminate such a beat, a technique of inserting a trap in a tuner circuit is disclosed in, for example, U.S. Pat. No. 3,416,086. However, when a television receiver and a video tape recorder (VTR) are into a single integrated manner or when separate units are placed close to each other and each of them is provided with an individual tuner, there has heretofore been no protection from the interfering signal applied to one tuner from the local oscillator signal or its harmonics from the other tuner.

SUMMARY OF THE INVENTION

It is an object of this invention to provide a television signal processing circuit which produces no beat interference from adjacent tuners by removing the above described defect of the prior art device. This object is accomplished by a trap connected to the intermediate frequency (IF) stage of the tuner from which interference is to be eliminated. The trap attenuates the interfering signal which is generated when two systems of adjacent receiving circuits are simultaneously operated and the receiving channel of one receiving circuit has a specific frequency relationship to the receiving channel of the other receiving circuit.

The other objects, features and advantages of the present invention will be apparent from the following description taken in conjunction with the accompanying drawings.

According to an aspect of the present invention, a television signal processing circuit comprises a first television channel including a first tuner and a first IF amplifier, a second television channel tuneable independently of said first television channel and including a second tuner and a second IF amplifier, coupling means for coupling signals between said first and second tuners, and frequency responsive trap means in a signal path of at least said first IF amplifier for rejecting at least one frequency which is generated by said second television channel and coupled to said first television channel by said coupling means.

BRIEF DESCRIPTION OF THE DRAWINGS

FIG. 1 is a block diagram showing one example of a television signal processing circuit of this invention, FIG. 2 shows the frequency relationships which cause interference.

DESCRIPTION OF THE PREFERRED EMBODIMENT

Figure 3:
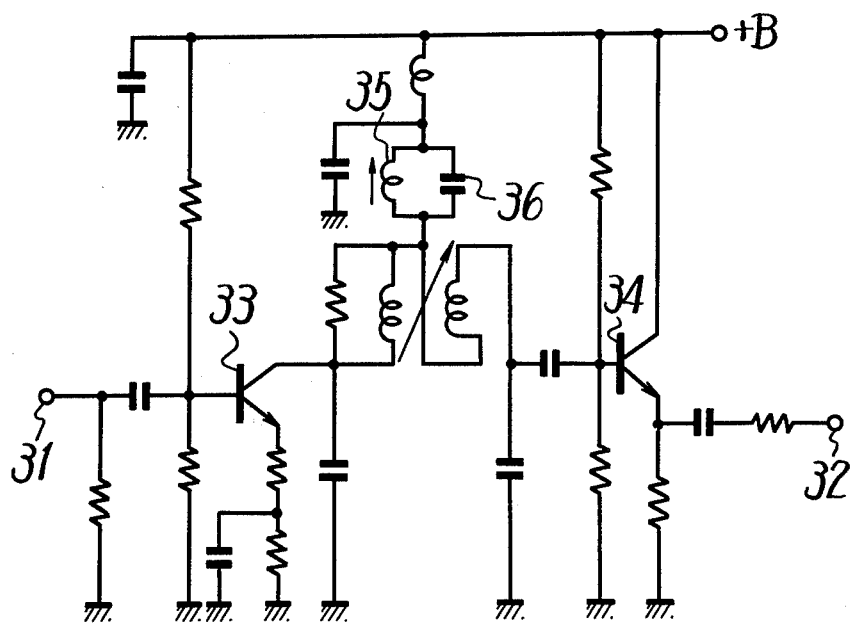
FIG. 3 is a circuit diagram showing one embodiment of the trap shown in FIG. 1.

In local television broadcasting VHF channels having 6 MHz spacing are often converted into UHF channels for broadcasting without any change other than frequency translation. In this case, two UHF channels may exist which are separated from each other by a frequency corresponding to 10 VHF channels. For example, UHF channels 50th, 52nd, 54th, 56th, 58th, 60th and 62nd may be alllocated in one local region so that there may exist the 50th and 60th channels and also the 52nd and 62nd channels which are respectively separated from each other by a frequency corresonding to 10 channels.

This is not a problem in a normal case. However, it may sometimes cause a problem when a plurality of signal processing circuits are located close enough together to produce coupling between their tuners.

By way of example, a single antenna is frequency used in common by two or more television sets instead of providing separate antennas for each television set, such as in a case of apartment house. A signal caught by the single antenna is delivered eah of the the to television receivers. A particularly difficult problem occurs when a television receiver is used with a VTR in which both the television receiver and the VTR have their own tuners, and television signals are applied thereto through a common antenna input terminal so that a so-called off-the-air program can be recorded by the VTR while the television receiver is in use. In such cases, the local oscillator signal of one tuner enters the input of the other tuner. When the channel separation of the two television signals corresponds to 10 channels the local oscillator signal of one tuner is mixed in the video IF band of the other tuner and is detected. As a result, a beat signal is produced.

As is well known, in each channel of NTSC-M system, such as used in Japan, the video carrier frequency is 1.25 MHz higher than the lowest frequency within its channel frequency band, the color subcarrier frequency is 3.58 MHz higher than the above video carrier frequency and its audio carrier frequency is 4.5 MHz higher than the video carrier frequency. The band width of one channel is 6 MHz. Further, in Japan, the video carrier frequency of the IF amplifier circuit is 58.75 MHz and the audio carrier frequency is 54.25 MHz.

Accordingly, if two channels which are separated from each other by a frequency corresponding to 10 channels, for example, the 50th and 60th channels are selected, and the video carrier frequencies of the 50th and 60th channels are taken as $f_{p1}$ and $f_{p2}$, respectively, the difference between the frequencies, $f_{p1}-f_{p2}$, is 6 MHz×10=60 MHz.

When the conversion system in the mixer of a tuner employes the upper side heterodyne system, the local oscillator frequency $f_{L1}$ for the 50th channel is higher than its video carrier frequency $f_{p1}$ by 58.75 MHz of video IF signal. Since the video carrier frequency is 1.25 MHz higher than the lowest frequency within the frequency band of the channel, the local oscillating frequency $f_{L1}$ of the 50th channel coincides with the lowest frequency within the frequency band of the 60th channel.

Accordingly, with an apparatus in which, for example, a television receiver and a VTR are integrally incorporated in a single cabinet, when the signal of the 60th channel is received by the television receiver while the signal of the 50th channel is being recorded on the VTR, the local oscillator signal of frequency $f_{L1}$ for the 50th channel is mixed with the radio frequency (RF) signal system entering the tuner of the television receiver. Thus, at the mixer of the television receiver tuner, the above local oscillator signal is frequency-converted by a local oscillator signal of frequency $f_{L2} = f_{p2} + 58.75 = f_{L1} + 60$ MHz for the 60th channel to produce a spurious interfering signal of frequency 60 MHz. Upon being detected, this signal interferes with the video carrier to produce a beat signal which causes interference on the screen of the television receiver.

In the United States television system, when two receiving channels are separated from each other by, for example, a frequency corresponding to the width of 8 VHF channels, a signal having a frequency of 6 MHz $\times 8 = 48$ MHz is generated in the IF stage and this signal interferes with the IF video carrier frequency 45.75 MHz to produce a beat signal of $48 - 45.75 = 2.25$ MHz.

As described above, the present invention provides a television signal processing circuit which prevents the aforesaid beat signal from being caused even though a plurality of video IF signal systems each having a tuner are used therein with an antenna circuit being connected thereto in common.

A description will hereinafter be given on one example of this invention with reference to FIG. 1.

In FIG. 1, 10 designates a signal system of a television receiver, 20 a signal system of a VTR, and 1 an antenna in common to both of the above systems. These signal systems 10 and 20 have the same construction, each including tuner 11, 21, video IF amplifier circuit 12, 22, and video detector circuit 13, 23, respectively. The tuner 11, 21 consists of RF amplifier circuit 14, 24, mixer 15, 25 and local oscillator circuit 16, 26, respectively.

In the example of this invention, a trap circuit 17, 27 for trapping a signal of 60 MHz is provided between tuner and video detector circuit, or between tuner 11, 21 and video IF amplifier 12, 22 in this example.

FIG. 3 shows one example of the trap circuit which is a parallel resonant circuit including a coil 35 and a capacitor 36. In FIG. 3, 31 is the input, 32 is the output, and 33 and 34 are transistors respectively serving as input and output buffer amplifier. With coil 35 and capacitor 36 properly selected in value, a signal of 60 MHz contained in a signal fed through the input 31 is attenuated by, for example, 30 through 40 dB to obtain an output signal from the output 32.

FIG. 2 shows the frequency relation among the above mentioned frequencies, in which $f_{C1}$ and $f_{C2}$ denote color subcarrier frequencies of 50th and 60th channels, $f_{S1}$ and $f_{S2}$ audio carrier frequencies of 50th and 60th channels, $f_{p2}$ (IF) and $f_{S2}$ (IF) video and audio carrier frequencies which are respectively converted into IF signals, and $f_{L1}$ (IF) an IF signal converted from the local oscillator signal of the 50th channel at a mixer of the 60th channel respectively.

In the case of a lower side heterodyne system, the local oscillator signal of 60th channel enters the frequency band of 50th channel to produce a beat signal.

Now, when the television receiver is receiving the 60th channel and the VTR is receiving the 50th channel, respectively, an RF signal received by the antenna 1 is supplied respectively through the RF amplifiers 14 and 24 to the mixers 15 and 25. The mixer 15 is supplied with a signal of frequency $f_{L2}$ from local oscillator 16 and mixer 25 is supplied with a signal of frequency $f_{L1}$ from the local oscillator 26, respectively, to derive therefrom IF signals which are respectively converted from broadcast signals on the 60th and 50th channels. These IF signals from the mixers 15 and 25 are supplied through trap circuits 17 and 27 and further through video IF amplifier circuits 12 and 22 to video detector circuits 13 and 23. The output of detector circuit 13 is fed through a receiving circuit (not shown) to a cathode ray tube to project a picture according to the broadcasting wave signal of 60th channel on its screen, while the output of detector circuit 23 is fed through a recording circuit to a rotary magnetic head (not shown) to record the broadcasting program of 50th channel on a magnetic tape.

In this case, as described above a signal of frequency $f_{L1}$ from the local oscillator 26 is converted into an IF signal at the mixer 15 of tuner 11 to derive therefrom a signal of 60 MHz. However, this signal of 60 MHz is removed by the trap circuit 17 as mentioned above, so that a beat signal of 1.25 MHz is not produced in the output of detector circuit 13.

Similarly, when the television receives is receiving the 50th channel and the VTR is receiving the 60th channel, a signal of 60 MHz appears in the output of the mixer 25. However, this signal of 60 MHz is similarly removed by the trap circuit 27 and hence no beat signal appears in the output of detector circuit 23.

Thus, according to the television signal processing circuit of this invention, the interference problem previously described can be eliminated by a the simple addition of a trap circuit resonant at 60 MHz inserted in the transmission path of IF signals between each tuner and its respective video detector circuit.

The trap circuit 17, 27 can be inserted in the IF signal transmission path at any point between tuner 11, 21 and video detector circuit 13, 23 respectively. However, it is preferable to locate the trap circuit at input side of video IF amplifier circuit 12, 22 as shown in FIG. 1.

Further, this invention is not limited to the trap frequency of the above embodiment but instead it is within the contemplation of the present invention to remove beat interference arising in accordance with channel plans of respective countries based upon the concept of this invention. When two receiving circuit systems are arranged adjacently and operated simultaneously, the local oscillator frequency of one tuner or its harmonic components are eliminated by a trap circuit inserted in the IF stage of the other receiving circuit. Inserting the trap circuit in the IF stage reduces the adverse influence of the trap circuit on overall frequency characteristics. In addition, undesirable signals are effectively removed even though the jamming signal is generated by operation on a different channel and, when the frequency difference between two channels is in specific value, traps of same frequency can be used in both channels.

It will be apparent that a number of changes and variations can be effected without departing from the scope of the novel concepts of the present invention.

I claim as my invention:

1. Television signal processing circuit for connection to an antenna comprising:
    (a) an RF tuner having an IF output and an RF input for connection to said antenna.
    (b) an IF amplifier coupled to the output of said RF tuner, and
    (c) a frequency responsive trap connected to a signal path of said IF amplifier for rejecting an undesirable signal applied from a local oscillator of another tuner connected to said antenna and having a frequency in the vicinity of an IF signal so as to prevent a beat signal from being caused by mutual interference between said IF signal and said undesirable signal.

2. Television signal processing circuit as set forth in claim 1, wherein said RF tuner and said other tuner are used for a television receiver and a VTR, respectively, and further comprising a single cabinet in which said RF tuner and said other tuner are located.

3. Television signal processing circuit as set forth in claim 1, wherein said trap circuit is a parallel resonant circuit including an inductor and a capacitor.

4. Television signal processing circuit as set forth in claim 1, wherein said frequency responsive trap is connected to the input of said IF amplifier.

5. Television signal processing circuit comprising:
a first television channel including a first tuner and a first IF amplifier;
a second television channel tuneable independently of said first television channel and including a second tuner and a second IF amplifier;
coupling means for coupling signals between said first and second tuners; and
frequency responsive trap means in a signal path of at least said first IF amplifier for rejecting at least one frequency which is generated by said second television channel and coupled to said first television channel by said coupling means.

6. Television signal processing circuit as set forth in claim 5, wherein said coupling means comprises means connecting said first tuner and said second tuner to a common antenna.

7. Television signal processing circuit as set forth in claim 5, wherein said coupling means comprises means locating said first and second television channels in close physical proximity.

8. Television signal processing circuit as set forth in claim 7, wherein said means locating the first and second television channels in close physical proximity is by a common cabinet in which said first and second television channels are disposed.

9. Television signal processing circuit as set forth in claim 5, wherein said frequency responsive trap means is located between said first tuner and said first IF amplifier.

10. Television signal processing circuit as set forth in claim 5, further comprising:
second frequency responsive trap means in a signal path of said second television channel, said second frequency responsive trap means being operative to reject the same frequency as the first mentioned frequency responsive trap means; and in which said at least one frequency is generated by said second television channel when said first and second television channels are tuned to receive signals spaced a predetermined frequency apart.

11. Television signal processing circuit as set forth in claim 5, wherein said at least one frequency is within the passband of said first IF amplifier.

12. Television signal processing circuit comprising:
(a) a first television channel including a first tuner and a first IF amplifier;
(b) a second television channel including a second tuner and a second IF amplifier;
(c) said first and second television channels being independently tuneable;
(d) said first tuner being operative to generate a first interfering signal falling within the passband of said second IF amplifier when said first and second television channels are tuned to different frequencies having a predetermined spacing;
(e) said second tuner being operative to generate a second interfering signal falling within the passband of said first IF amplifier when said first and second television channels are tuned to different frequencies having said predetermined spacing;
(f) coupling means for coupling said first interfering signal to said second television channel and for coupling said second interfering signal to said first television channel;
(g) said first and second interfering signals being convertible by said second and first tuners respectively to bear the same frequency relationship to the passband of said second and first IF amplifiers respectively; and
(h) first frequency responsive trap means responsive to a trap frequency in the input to said first IF amplifier for attenuating said second interfering signal;
(i) second frequency responsive trap means responsive to said trap frequency in the input to said second IF amplifier for attenuating said first interfering signal.

* * * * *